United States Patent
Kang et al.

(10) Patent No.: US 8,135,235 B2
(45) Date of Patent: Mar. 13, 2012

(54) PRE-PROCESSING METHOD AND APPARATUS FOR WIDE DYNAMIC RANGE IMAGE PROCESSING

(75) Inventors: Bong-hyup Kang, Changwon (KR); Chang-won Jeon, Anyang-si (KR); Han-seok Ko, Seoul (KR)

(73) Assignees: Samsung Techwin Co., Ltd., Changwon (KR); Korea University Industrial & Academic Collaboration Foundation, Seoul (KR)

( * ) Notice: Subject to any disclaimer, the term of this patent is extended or adjusted under 35 U.S.C. 154(b) by 549 days.

(21) Appl. No.: 12/381,920

(22) Filed: Mar. 18, 2009

(65) Prior Publication Data
US 2009/0268963 A1 Oct. 29, 2009

(30) Foreign Application Priority Data
Apr. 23, 2008 (KR) .................... 10-2008-0037837

(51) Int. Cl.
*G06K 9/36* (2006.01)
*G09G 5/02* (2006.01)
*H04N 9/77* (2006.01)

(52) U.S. Cl. .................... 382/276; 345/604; 348/663
(58) Field of Classification Search .................. 382/162, 382/168, 173, 254, 274, 276, 284; 348/362, 348/663; 345/589, 604
See application file for complete search history.

(56) References Cited

U.S. PATENT DOCUMENTS

| | | | |
|---|---|---|---|
| 5,828,793 A * | 10/1998 | Mann | 382/284 |
| 6,501,504 B1 | 12/2002 | Tatko et al. | |
| 6,825,884 B1 * | 11/2004 | Horiuchi | 348/362 |
| 7,460,168 B2 * | 12/2008 | Horiuchi | 348/362 |
| 7,916,937 B2 * | 3/2011 | Utsugi et al. | 382/162 |

OTHER PUBLICATIONS

Fattal et al., "Gradient Domain High Dynamic Range Compression," Proceedings of the 29th Annual Conference on Computer Graphics and Interactive Techniques, pp. 249-256 (2002).

* cited by examiner

*Primary Examiner* — Kanjibhai Patel
(74) *Attorney, Agent, or Firm* — Drinker Biddle & Reath LLP

(57) ABSTRACT

Provided are method and apparatus of pre-processing in WDR (wide dynamic range) image processing, the method of pre-processing of WDR image processing including: (a) receiving luminance and chrominance signals having different exposure times, and analyzing the correlation between a luminance signal having a first exposure time and a luminance signal having a second exposure time that is longer than the first exposure time; (b) based on the result of the analysis, dividing each of the luminance signal having the first exposure time and the luminance signal having the second exposure signal, into at least one of a bright region, a transition region, and a dark region; and (c) normalizing the regions of the luminance signal having the first exposure time to respectively correspond to the regions of the luminance signal having the second exposure times.

19 Claims, 6 Drawing Sheets

PRE-PROCESSING METHOD AND APPARATUS FOR WIDE DYNAMIC RANGE IMAGE PROCESSING

CROSS-REFERENCE TO RELATED PATENT APPLICATION

This application claims the benefit of Korean Patent Application No. 10-2008-0037837, filed on Apr. 23, 2008 in the Korean Intellectual Property Office, the disclosure of which is incorporated herein in its entirety by reference.

BACKGROUND

1. Field of the Invention

The present invention relates to image processing, and more particularly, to a method and apparatus for pre-processing images in wide dynamic range (WDR) image processing and a method and apparatus for WDR image processing using the pre-processing method and apparatus.

2. Description of the Related Art

When photographing an image that includes both bright regions and dark regions due to great differences in the illumination intensity of the photographing scene, an image clearly showing both the bright and dark regions cannot be obtained even when the exposure time and the aperture are properly adjusted. Thus, in this case, a wide dynamic range (WDR) function is used so that an image for which the exposure is adjusted so as to clearly show the bright regions and an image for which the exposure is adjusted so as to clearly show the dark regions are fused. Accordingly, an image in which both the bright and dark regions are clearly shown can be obtained.

Various image photographing devices such as security cameras, digital cameras, broadcasting filming apparatus, cameras for automobiles, mobile cameras, etc. have a WDR function. When the WDR function is used, a clear image can be photographed in cases when, for example, a picture is taken indoors when backlight exists, during night photography when both bright regions and dark regions are present, when photographing a sports scene where bright regions due to sunlight and dark regions due to shadows are mixed, etc.

In general, to realize a WDR function, a block unit fusion method or a pixel unit fusion method is used.

In the block unit fusion method, image fusion units are set as blocks, and fusion rates are set differently for each block. The speed of the block unit fusion method is higher than that of the pixel unit fusion method, but since the blocks are fused by different fusing processes from one another, differences are generated in the luminance between the blocks, and thus an anti-blocking process is essentially required to solve this problem. Also, according to the blocks, an image with a predetermined portion having different brightness from other portions may be output.

In the pixel unit fusion method, one image fusing unit is set as one pixel and is fused corresponding to the pixel. Examples of the pixel unit fusion method include pixel unit fusion using a weight-sum in the spatial domain, and pixel unit fusion using the gradient domain. In the pixel unit fusion method using a weight-sum, weights are set differently for each of the pixels. Details of this method are disclosed in U.S. Pat. No. 6,501,504, titled "Dynamic Range Enhancement for Imaging Sensors" to H. John Tatko, and in U.S. Pat. No. 6,825,884, titled "Imaging Processing Apparatus for Generating a Wide Dynamic Range Image" to Kazuhito Horiuchi. In the pixel unit fusion method using the gradient domain, an input image having a long exposure time and an input image having a short exposure time are converted into the gradient domain, thereby adjusting the sizes of gradients and determining the fusion ratios for each of the pixels units. This method has great performance, but due to the large amount of calculation, it cannot be applied to image devices for real-time processing. Details of this method are disclosed by R. Fattal et al. in "Gradient Domain High Dynamic Range Compression", Proceedings of the 29th annual conference on Computer graphics and Interactive Techniques, pp. 249-256, 2002.

In the above-described conventional WDR methods, when an image is photographed without determining the optimal values of the exposure time of each of two different input images having different exposure times according to the respective scenes, imbalance in the image luminance is caused, which leads to low image quality. Also, since the illumination intensity is different for the bright and dark regions depending on the photographed scenes, the proper exposure time for each of the scenes should be accurately determined. Nevertheless, there is a need for a technology to obtain an optimal fusion result even when the proper exposure time is not detected.

Also, since an exposure time for receiving one input image is divided to receive two different input images having different exposure times, the range of adjusting the exposure time is limited. In particular, in the case of an image having a long exposure time, a fixed exposure time needs to be used to minimize color rolling caused by the light emitting period of phosphor light. In addition, in the case of an image having a short exposure time, the range of adjusting the exposure time is greatly limited.

SUMMARY

The exemplary embodiments provide a method and apparatus for pre-processing in wide dynamic range (WDR) image processing, wherein the correlation between input images having different exposure times is analyzed to normalize the luminance of an input image to thereby solve the imbalance in image luminance and to obtain an optimal WDR image even when the range of adjusting the exposure time is limited.

The exemplary embodiments also provide a method and apparatus for WDR image processing using the method and apparatus for pre-processing.

According to an aspect of an exemplary embodiment, there is provided a method of pre-processing in wide dynamic range (WDR) image processing, the method comprising: (a) receiving luminance and chrominance signals having different exposure times, and analyzing the correlation between a luminance signal having a first exposure time and a luminance signal having a second exposure time that is longer than the first exposure time; (b) based on the result of the analysis, dividing each of the luminance signal having the first exposure time and the luminance signal having the second exposure time into at least one of a bright region, a transition region, and a dark region; and (c) normalizing the regions of the luminance signal having the first exposure time to respectively correspond to the regions of the luminance signal having the second exposure time.

According to another exemplary embodiment, there is provided a pre-processing apparatus in a wide dynamic range (WDR) image processing, comprising: a region determining unit receiving luminance and chrominance signals having different exposure times and among the different exposure times, analyzing the correlation between a luminance signal having a first exposure time and a luminance signal having a second exposure time that is longer than the first exposure time, and based on the result of the analysis, dividing each of the luminance signal having the first exposure time and the luminance signal having the second exposure signal into a bright region, a transition region, and a dark region, and a normalizing unit normalizing the regions of the luminance signal having the first exposure time so as to respectively correspond to the regions of the luminance signal having the second exposure time.

According to another exemplary embodiment, there is provided a method of wide dynamic range (WDR) image processing, the method comprising: (a) receiving luminance and chrominance signals having different exposure times and normalizing a luminance signal having a first exposure time so as to correspond to a luminance signal having a second exposure time that is longer than the first exposure time; (b) adding up the luminance signal having the second exposure time and the normalized luminance signal having the first exposure time using a first weight; (c) adding up a chrominance signal having the first exposure time and a chrominance signal having the second exposure time using a second weight to which the result of the adding in (b) is reflected; and (d) converting the fused luminance signal and the fused chrominance signal into an RGB signal to be output as a WDR resultant image signal.

According to another exemplary embodiment, there is provided a wide dynamic range (WDR) image processing apparatus, comprising: a luminance/chrominance converting unit converting image signals obtained at different exposure times into luminance and chrominance signals, a pre-processing unit normalizing a luminance signal having a first exposure time among the different exposure times to correspond to a luminance signal having a second exposure time that is longer than the first exposure time; a luminance fusing unit adding up the luminance signal having the second exposure time and the normalized luminance signal having the first exposure time using a first weight; a chrominance fusing unit adding up a chrominance signal having the first exposure time and a chrominance signal having the second exposure time using a second weight to which the result of the addition of the luminance fusing unit is reflected; and an RGB converting unit converting the fused luminance signal output from the luminance fusing unit and the fused chrominance signal output from the chrominance fusing unit into an RGB signal to be output as a WDR resultant image signal.

According to another exemplary embodiment, there is provided a recording medium having embodied thereon a computer program for executing the above-described methods.

BRIEF DESCRIPTION OF THE DRAWINGS

The above and other features and advantages of the exemplary embodiments will become more apparent by describing in detail exemplary embodiments thereof with reference to the attached drawings in which.

DETAILED DESCRIPTION

The exemplary embodiments will now be described more fully with reference to the accompanying drawings, in which exemplary embodiments are shown.

Figure 1:
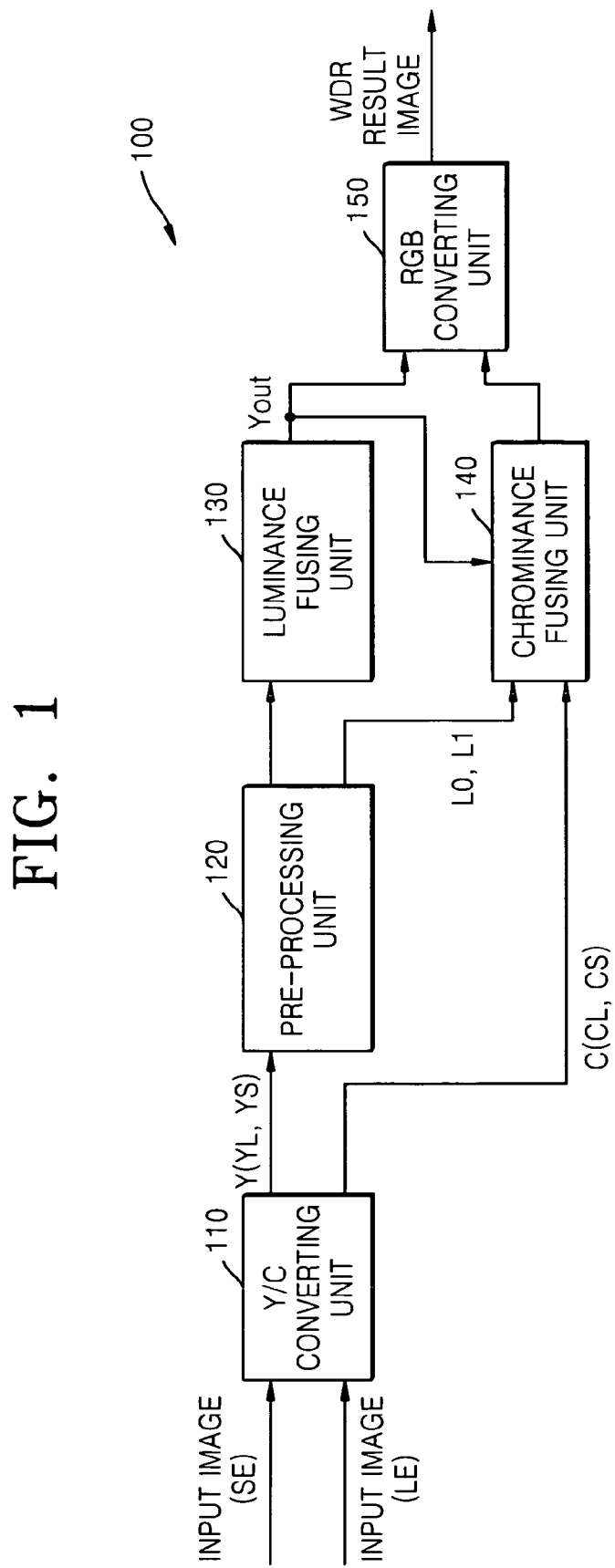
FIG. 1 is a schematic block diagram of a wide dynamic range (WDR) image processing apparatus according to an exemplary embodiment.

FIG. 1 is a schematic block diagram of a wide dynamic range (WDR) image processing apparatus 100 according to an exemplary embodiment.

Referring to FIG. 1, the WDR image processing apparatus 100 comprises a Y/C converting unit 110, a pre-processing unit 120, a luminance fusing unit 130, a chrominance fusing unit 140, and a RGB converting unit 150.

The Y/C converting unit 110 converts image signals obtained at different exposure times into luminance or chrominance signals. Image signals may be obtained at different exposure times when two images are photographed with respect to one scene at different exposure times during a predetermined time. For example, 1/60 sec, for WDR image processing. One of the images may have a relatively long exposure-time and may include a dark region corresponding to an indoor scene in the image. The other image may have a relatively short exposure time and may include a bright corresponding to an outdoor scene in the image. The Y/C converting unit 110 converts image signals having two different exposure times and generated by an image obtaining unit (not shown), for example, a CCD (charge coupled device) image sensor into a luminance component of a color image and a chrominance component of a color image, respectively.

The pre-processing unit 120 normalizes a luminance signal having a first exposure time among the different exposure times and output from the Y/C converting unit 110 so as to correspond to a luminance signal having a second exposure time that is longer than the first exposure time. A first exposure time is related to an image having a relatively short exposure time, which is referred to as an SE image, and a second exposure time is related to an image having a relatively long exposure time, which is referred to as an LE image. For example, the second exposure time may be eight times higher than the first exposure time, and this ratio may be adjusted so as to properly separate a bright region from a dark region. Also, since the human eye is more sensitive to a luminance change than to a chrominance change, a pre-process may be performed using each of the luminance signals of the SE image and LE image. The luminance signals of the SE image and LE image are defined as YS and YL, respectively. That is, the YS signal is normalized to fit to a reference point of the YL signal before fusing the two images, that is, the SE image and LE image, thereby minimizing imbalance in image luminance, so that an optimal WDR resultant image can be obtained even when the adjustment range of the exposure time is restricted. The structure and function of the pre-processing unit 120 will be described in detail later with reference to FIGS. 2 and 4.

The luminance fusing unit 130 adds up the luminance signal having the second exposure time and the luminance signal having the normalized first exposure time using a first weight. For WDR image processing, the luminance component and the chrominance component of an image are divided in order to fuse the image. Thus, the hardware complexity can be reduced compared to the case when the RGB color space is used, and also the imbalance generated during adjustment of R, G, B components can be reduced. The luminance fusing unit 130 adjusts the weights of the YS signal and YL signal to add them up, thereby generating a luminance image in which both a bright region and a dark region are clearly shown. Also, by performing a post-process to enhance the clarity contrast ratio of the selectively fused luminance image, an artifact generated during the fusion can be minimized. The structure and function of the luminance fusing unit 130 will be described in detail later with reference FIGS. 2, 5, and 6.

The chrominance fusing unit 140 adds up a chrominance signal CL having a first exposure time and a chrominance signal CS having a second exposure time by using a second weight accounting for the result of luminance fusion of the luminance fusing unit 130. Also, post-process such as chroma improvement and color balance adjustment may be selectively performed.

The RGB converting unit 150 converts the fused luminance signal output from the luminance fusing unit 130 and the fused chrominance signal output from the chrominance fusing unit 140, that is, the Y/C signal, into an RGB signal, thereby outputting a WDR resultant image signal.

Figure 2:
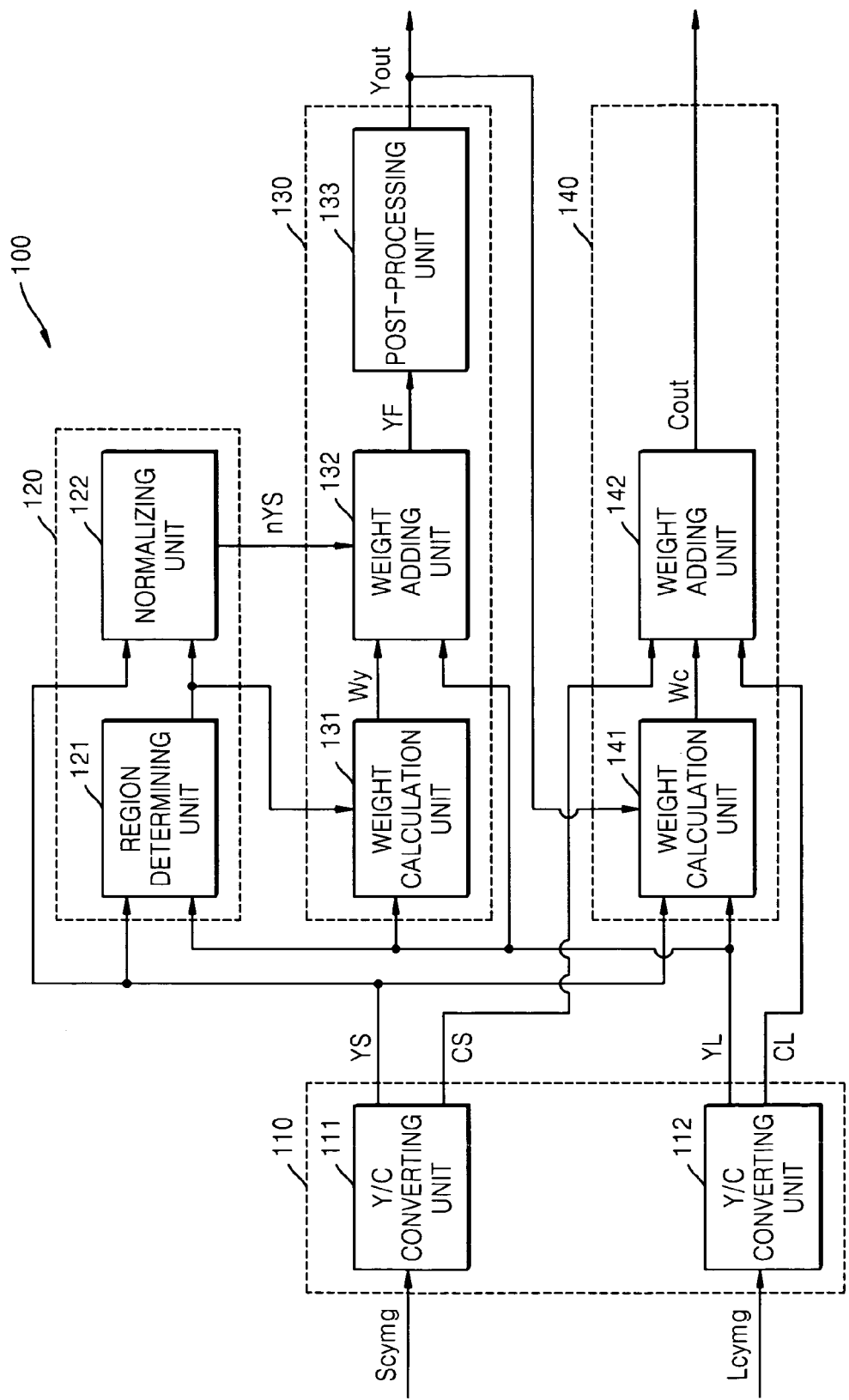
FIG. 2 is a detailed block diagram of the WDR image processing apparatus of FIG. 1.

FIG. 2 is a detailed block diagram of the WDR image processing apparatus 100 illustrated in FIG. 1.

The Y/C converting unit 110 converts an image signal including raw data, which is in the form of $S_{cymg}$, $L_{cymg}$, output from an image obtaining unit (not shown), for example, a CCD, into a luminance signal and a chrominance signal. The term "cymg" (cyan, yellow, magenta, green) means a complementary color filter of CYMG, that is, a filter for adding color information to the CCD. A 12 bit image signal of each of CYMG is input to the Y/C converting unit 110. It is preferable to discard lower 2 bits of the 12 bit image signal, which are mostly noise, and use a 10 bit image signal. Each of the input image signals are divided into one luminance component (Y) and two chrominance components (C). The luminance component (Y) indicates how bright or how dark an image is. Chrominance C indicates color information, and the two chrominance components have a Cr value and a Cb value. A Cr value refers to a difference between a reference value and a red color component, and a Cb value refers to a different between a reference value and a blue color component.

A Y/C converting unit 111 receives an image signal $S_{cymg}$ having a relatively short exposure time to output a YS signal and CS signal. The YS signal refers to a luminance signal having a relatively short exposure time, and the CS signal refers to a chrominance signal having a relatively short exposure time.

A Y/C converting unit 112 receives an image signal $L_{cymg}$ having a relatively long exposure time to output an YL signal and CL signal. The YL signal refers to a luminance signal having a relatively long exposure time, and the CL signal refers to a chrominance signal having a relatively long exposure time.

The pre-processing unit 120 includes a region determining unit 121 and a normalizing unit 122.

Figure 3A:
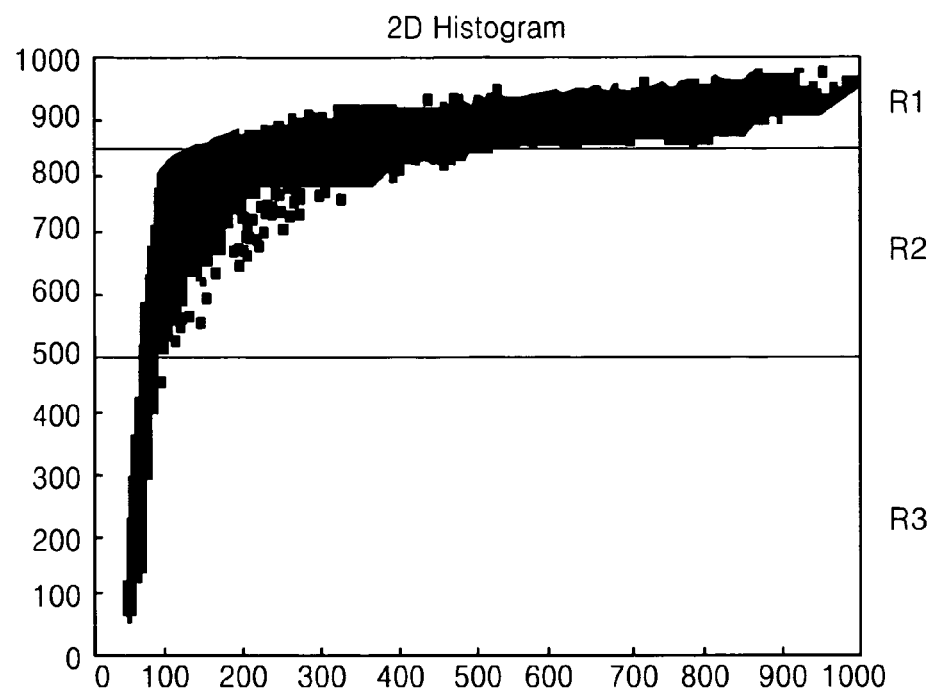
FIGS. 3A and 3B are schematic views for explaining a method of dividing and determining an input image obtained at different exposure times into three regions, according to another exemplary embodiment.

The region determining unit 121 analyzes the correlation between the luminance signal having the first exposure time and the luminance signal having the second exposure time that is longer than the first exposure time. Based on the result of the analysis, the region determining unit 121 divides each of the luminance signal having the first exposure time and the luminance signal having the second exposure time into a bright region, a transition region, and a dark region. The region determining unit 121 receives a YS signal and YL signal and analyzes the correlation between YS signal and YL signal using a 2D histogram. For example, when a 10 bit YS signal is represented on the X axis, the 10 bit YS signal has a value between 0 through 1023, and when a 10 bit YL signal is represented on the Y axis, the 10 bit YL signal has a value between 0 through 1023. A value of a luminance component of a pixel at the same position of the images of the YS signal and YL signal is expressed using one coordinate expressed as (YS, YL). FIG. 3A illustrates a 2D histogram expressed in this way.

Figure 3B:
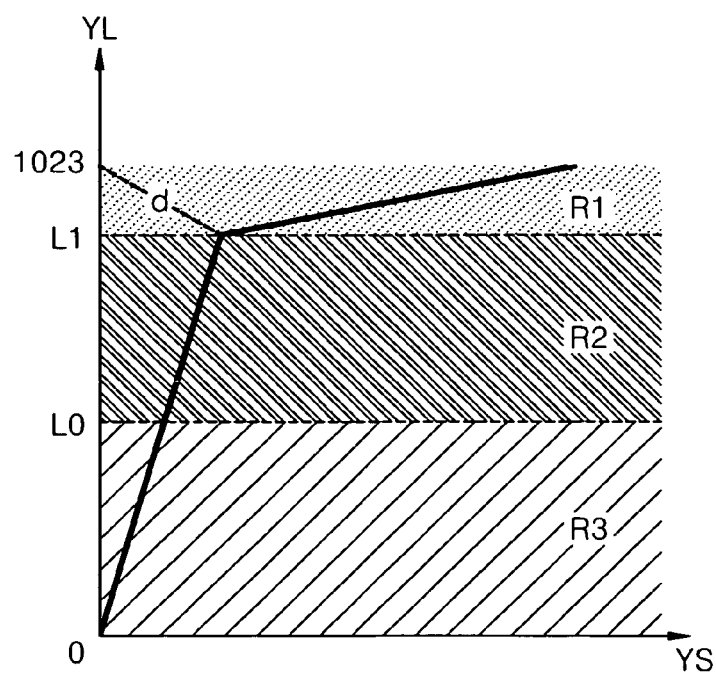

Next, the YS signal and YL signal are divided into a region R1, a region R2, and a region R3. To this end, a reference for dividing regions should be used. Referring to FIG. 3B, a boundary L1 between the regions R1 and R2 and a boundary L0 between the regions R2 and R3 are determined. The boundary L1 is fixed to a minimum distance point d between a curved portion of the 2D histogram and a coordinate (0, 1023). The boundary L0 is determined by multiplying the boundary L1 by a multiple of a fractional number between 0 through 1 according to the condition of the input image. The condition of the input image may be based on the difference in luminance between a dark region and a bright region of the input image and the degree of expression of details of the bright region.

In detail, an image can be divided into three regions—a bright region R1, a transition region R2, and a dark region R3 based on the boundaries L0 and L1. The bright region R1 is a relatively bright region and is expressed well in an image having a relatively short exposure time. For example, the bright region R1 may be an outdoor scene. The transition region R2 is a region between the bright region R1 and the dark region R3, where the possibility of generation of a WDR fusion artifact is greatest due to the abrupt change in luminance. The transition region R2 is required to minimize a fusion artifact. The dark region R3 is a relatively dark region and is well expressed in an image having a long exposure time. For example, the dark region R3 may be an indoor scene.

Figure 4A:
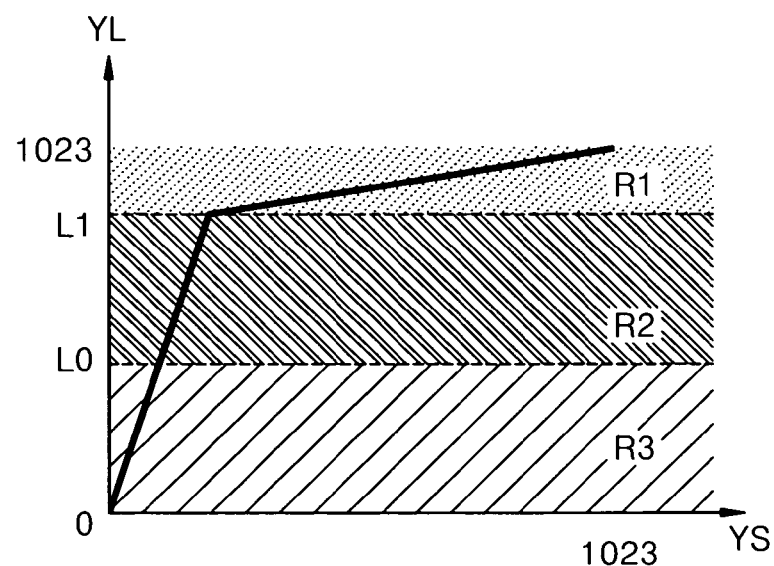
FIGS. 4A and 4B are diagrams for explaining a normalizing method, according to another exemplary embodiment.

The normalizing unit 122 normalizes the regions of the luminance signal having a first exposure time so as to correspond to the regions of the luminance signal having the second exposure time. The normalizing unit 122 receives a YS signal, and a region boundary value from the region determining unit 121 to normalize the YS signal based on the region boundary information. That is, the normalizing unit 122 normalizes the YS signal so as to adjust to the size of the YL signal. Referring to FIG. 4A, the division and range of the three regions of YL signal and YS signal are checked, and a gain and an offset for normalization are calculated using a maximum of each of the corresponding regions.

A gain of the bright region R1 is calculated using Equation 1 below.

$$\text{gain of the region } R1 = \text{area of the region } R1 \text{ of } YL \text{ signal/area of the region } R1 \text{ of } YS \text{ image signal} \quad \text{[Equation 1]}$$

Gains of the regions R2 and R3 can be calculated in the same manner.

An offset of the region R1 is calculated using Equation 2 below.

$$\text{offset of the region } R1 = \text{minimum of the region } R1 \text{ of } YL \text{ signal} \quad \text{[Equation 2]}$$

Also, offsets of the regions R2 and R3 can be calculated in the same manner.

The region R1 of an nYS signal, which is the result of normalizing the YS image to have the maximum of YL image using the gain and the offset calculated using Equations 1 and 2 can be calculated using Equation 3.

region R1 of nYS signal=gain of the region R1*(region
R1 of YL signal−minimum of region R1 of YS
image)+offset of the region R1 [Equation 3]

Figure 4B:
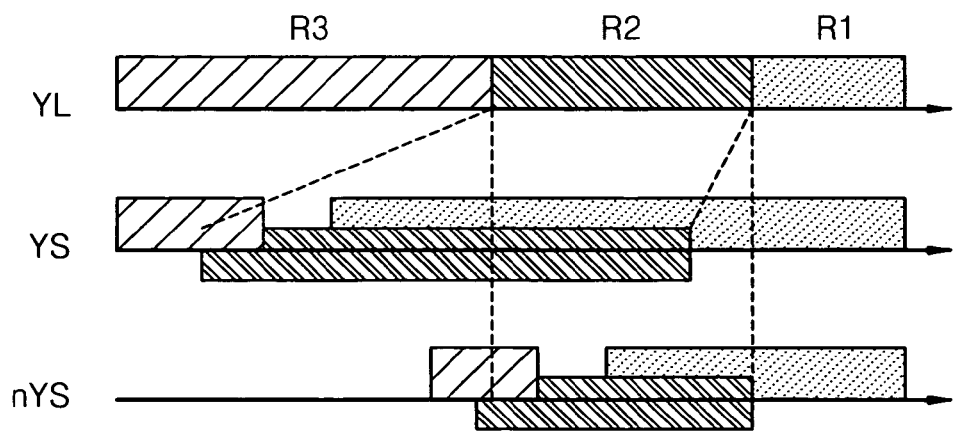

In the same way, the regions R2 and R3 of the nYS signal can be obtained, as illustrated in FIG. 4B. Referring to FIG. 4B, the region boundary of the nYS signal is moved such that the YS signal corresponds to the YL signal.

Through normalization of the YS signal, the imbalance of the image luminance is minimized, and even when the exposure time is restricted, instead of adjusting the exposure time, an input image is converted to be adapted to WDR fusion and the weight of the transition region R2 is finely adjusted in a next luminance fusing operation, thereby minimizing the WDR fusion artifact.

The luminance fusing unit 130 comprises a weight calculation unit 131, a weight adding unit 132, and a post-processing unit 133.

Figure 5:
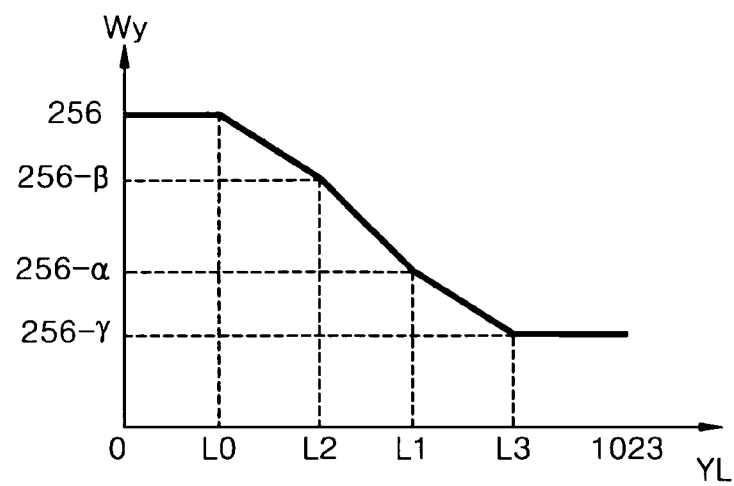
FIG. 5 is a diagram for explaining a luminance fusion method according to another exemplary embodiment.

The weight calculation unit 131 calculates a first weight using the luminance signal having the second exposure time and the result of division of the regions. The luminance signal having the second exposure time calculates a weight $W_y$ using the luminance signal having a relatively long exposure time, the result of division of regions from the region determining unit 121, and the boundary values of the regions, for example, L0 and L1. Referring to FIG. 5, a value of a YL signal, for example, a weight $W_y$ according to L0 and L1, is illustrated. As described above, in order to finely adjust the weight of the transition region R2, the weight with respect to boundaries L2 and L3 may be adjusted again based on the boundary L1.

The weight adding unit 132 adds up a luminance signal having a second exposure time and a luminance signal having a normalized first exposure time using the first weight. That is, the weight adding unit 132 adds up the luminance signal YL having a relatively long exposure time and the normalized luminance signal nYS output from the normalizing unit 122 using a weight $W_y$ output from the weight calculation unit 131 as in Equation 4 below.

$$YF=(W_y/256)*YL+(1-W_y/256)*nYS \quad \text{[Equation 4]}$$

YF is a fused luminance component, and $W_y$ is a weight of the YL signal.

In a dark region, that is, when the YL signal is between 0 and L0, a YS signal contains unnecessary information such as dark noise, and thus a maximum weight, that is, 256, is used so that only an YL signal is used in the region R3. In a bright region, that is, when a YL signal is between L1 and 1023, since saturation is generated in the YL signal, a weight is determined so that the YS signal is used as much as possible. In addition, by setting a weight to be a predetermined value, for example, 256-γ, or greater, a reverse phenomenon in which a dark region becomes brighter than a bright region when a fusion image is generated can be prevented.

Figure 6:
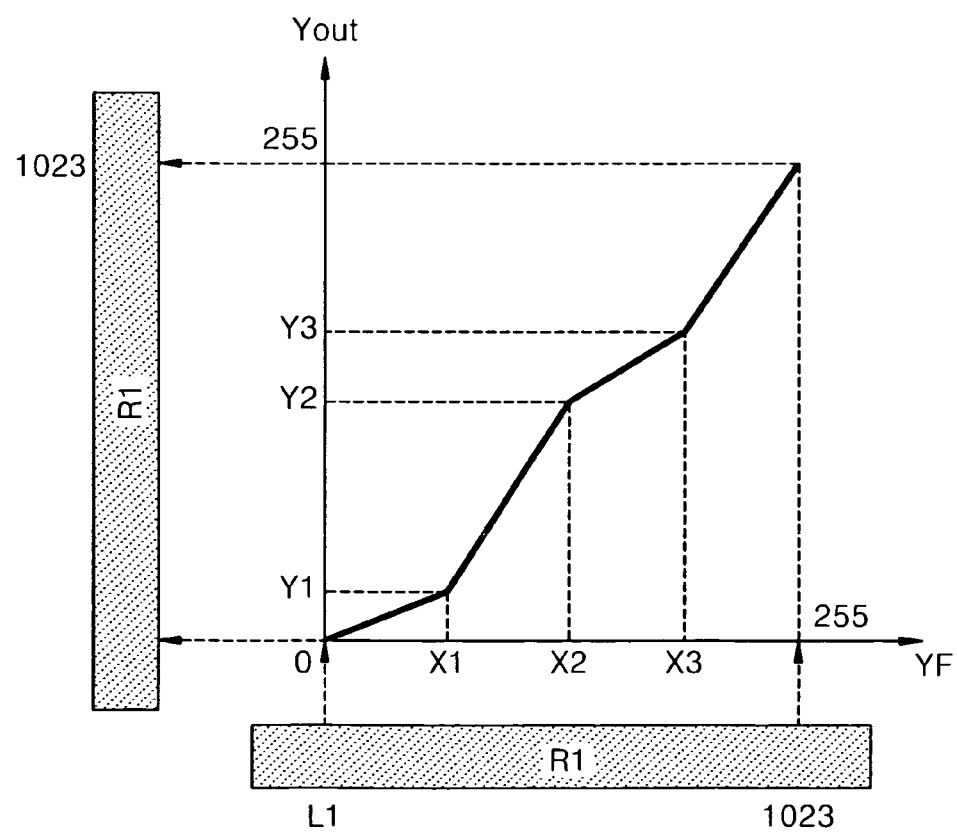
FIG. 6 is a diagram for explaining a contrast ratio enhancing method according to another exemplary embodiment.

The post-processing unit 133 may improve the clarity contrast ratio by applying a function as illustrated in FIG. 6 in order to emphasize a contrast ratio of a predetermined region in the result of the luminance fusion. The post-processing unit 133 is shown in FIG. 2, but this is optional and may be omitted in the WDR image processing apparatus.

The chrominance fusing unit 140 comprises a weight calculation unit 141 and weight adding unit 142.

The weight calculation unit 141 calculates a second weight $W_c$ using signal $Y_{OUT}$ output from the post-processing unit 141 and the YS signal and YL signal. The second weight $W_c$ is the ratio of the input luminance component of YL and YS signals and the result luminance component of the signal $Y_{OUT}$. As CL and CS are chrominance signals respectively corresponding to YL and YS signals, they should match the ratio of the signal $Y_{OUT}$ that varies in the fusion process.

The weight adding unit 142 adds the chrominance signal CS having a relatively short exposure time and a chrominance signal CL having a relatively long exposure time by multiplying the chrominance signals CS and CL by the second weight $W_c$ output from the weight calculation unit 141. Accordingly, an image in which both a bright region and a dark region are clear can be obtained.

Figure 7:
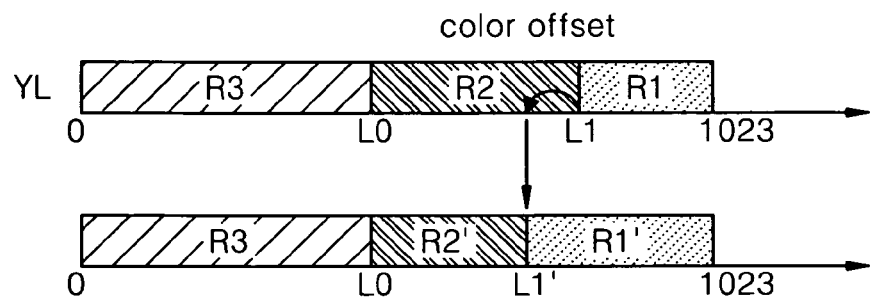
FIG. 7 is a diagram for explaining a chrominance fusion method according to another exemplary embodiment.

FIG. 7 is a schematic view for explaining a method of chrominance fusion according to another exemplary embodiment.

Referring to FIG. 7, since the saturation sections where the luminance component and the chrominance component are different, the regions R1 and R2 should not be treated as the same region. Thus, a boundary between the regions R1 and R2 may be varied in a region used for luminance fusion, by using a variable such as a color offset.

Selectively, in order to improve balance and chroma, gains are used for each of the regions to control the chroma and uniformity in one scene.

Figure 8:
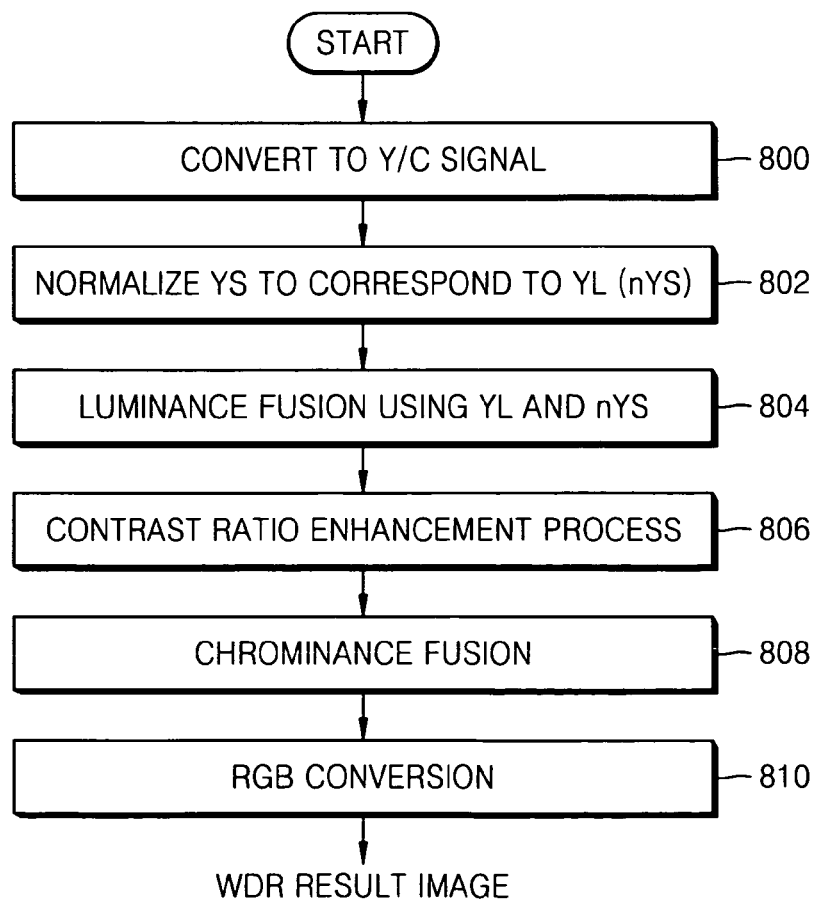
FIG. 8 is a flowchart illustrating a WDR image processing method according to another exemplary embodiment.

FIG. 8 is a flowchart illustrating a WDR image processing method according to another exemplary embodiment.

Referring to FIG. 8, in operation 800, image signals $S_{cymg}$ and $L_{cymg}$ obtained at different exposure times are received and converted into Y/C signals,—YS, CS, and YL, CL—respectively. In operation 802, before fusing luminance, a YS signal is normalized to nYS so as to correspond to a YL signal. Here, the correlation between YS signal and YL signal is analyzed using 2D histograms of the YS signal and YL signal, and the YS signal and YL signal are each divided into three regions based on the result of the analysis, and the regions of the YS signal are normalized to respectively correspond to the regions of the YL signal.

Next, in operation 804, a YF signal, which is the result of the luminance fusion of the YL signal and normalized nYS signal using a predetermined weight, is output. In operation 806, a contrast ratio enhancing process is performed with respect to the result of the selective luminance fusion, thereby outputting a $Y_{OUT}$ signal. In operation 808, chrominances of a CS signal and CL signal are fused using a predetermined weight, which accounts for the result of chrominance fusion, to output a $C_{OUT}$ signal. In operation 810, a Y/C signal that is constituted of YF signal output in operation 804 or $Y_{OUT}$ signal output in operation 806 and $C_{OUT}$ signal output in operation 808 is converted into a RGB signal, thereby outputting the final WDR image processing result.

The invention can also be embodied as computer readable codes on a computer readable recording medium. The computer readable recording medium may be any data storage device that can store data which can be thereafter read by a computer system.

Examples of the computer readable recording medium may include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the various exemplary embodiments pertain.

According to the apparatus and method of WDR image processing of exemplary embodiments, the imbalance of image luminance can be solved by normalizing the luminance of the input image by analyzing the correlation between input images having different exposure times. Moreover, even when the exposure time is restricted, an optimal WDR image can be generated by normalizing the luminance of the input images.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of pre-processing in wide dynamic range (WDR) image processing, the method comprising:
   (a) receiving luminance and chrominance signals having different exposure times, analyzing, utilizing a processor, the correlation between a luminance signal having a first exposure time and a luminance signal having a second exposure time that is longer than the first exposure time;
   (b) based on the result of the analysis, dividing each of the luminance signal having the first exposure time and the luminance signal having the second exposure time into at least one of a bright region, a transition region, and a dark region; and
   (c) normalizing the regions of the luminance signal having the first exposure time to respectively correspond to the regions of the luminance signal having the second exposure time.

2. The method of claim 1, wherein the analysis of the correlation is conducted using a 2D histogram expressing luminance components in the same pixel of the luminance signal having the first exposure time and the luminance signal having the second exposure time.

3. The method of claim 1, wherein (b) comprises:
   (b1) determining a boundary between the bright region and the transition region using a distance between a portion of the luminance signal having the second exposure time in which the brightness of the luminance signal is abruptly changed, and a maximum luminance component of the luminance signal having the second exposure time; and
   (b2) determining a boundary between the transition region and the dark region based on the boundary between the luminance region and the transition region, depending on the received luminance and chrominance signals.

4. The method of claim 3, wherein the boundary between the bright region and the transition region is determined based on a point where the distance is the smallest.

5. The method of claim 4, wherein the boundary between the transition region and the dark region is fixed to a multiple of a fractional number between 0 and 1 of the point where the distance is the smallest depending on the condition of the obtained image signals.

6. The method of claim 1, wherein (c) comprises:
   (c1) calculating a gain and an offset with respect to each of the regions; and
   (c2) calculating and normalizing the regions of the luminance signal having the first exposure time so as to respectively correspond to the maximums of the regions of the luminance signal having the second exposure time using the calculated gain and the calculated offset.

7. A method of wide dynamic range (WDR) image processing, the method comprising:
   (a) receiving luminance and chrominance signals having different exposure times and normalizing a luminance signal having a first exposure time so as to correspond to a luminance signal having a second exposure time that is longer than the first exposure time;
   (b) adding up, utilizing a processor, the luminance signal having the second exposure time and the normalized luminance signal having the first exposure time using a first weight;
   (c) adding up a chrominance signal having the first exposure time and a chrominance signal having the second exposure time using a second weight to which the result of the adding in (b) is reflected; and
   (d) converting the added luminance signal and the added chrominance signal into a RGB signal to be output as a WDR resultant image signal.

8. The method of claim 7, wherein (a) comprises:
   (a1) analyzing the correlation between the luminance signal having the first exposure time and the luminance signal having the second exposure time, and dividing each of the luminance signal having the first exposure time and the luminance signal having the second exposure signal into at least one of a bright region, a transition region, and a dark region, based on the result of the analysis; and
   (a2) normalizing the regions of the luminance signal having the first exposure time so as to respectively correspond to the regions of the luminance signal having the second exposure time.

9. The method of claim 8, wherein (b) comprises:
   (b1) calculating a first weight using the luminance signal having the second exposure time and the result of division of the regions; and
   (b2) adding up the luminance signal having the second exposure time and the luminance signal having the first exposure time using the calculated first weight.

10. The method of claim 9, wherein the first weight is calculated by using the result of division of the regions.

11. The method of claim 9, wherein (b) further comprises performing a contrast ratio enhancing process on the result of the addition.

12. A non-transitory computer readable storage medium having embodied thereon a computer program for executing a method of pre-processing in wide dynamic range (WDR) image processing, the method comprising:
   (a) receiving luminance and chrominance signals having different exposure times, analyzing the correlation between a luminance signal having a first exposure time and a luminance signal having a second exposure time that is longer than the first exposure time;
   (b) based on the result of the analysis, dividing each of the luminance signal having the first exposure time and the luminance signal having the second exposure time into at least one of a bright region, a transition region, and a dark region; and
   (c) normalizing the regions of the luminance signal having the first exposure time to respectively correspond to the regions of the luminance signal having the second exposure time.

13. A pre-processing apparatus in a wide dynamic range (WDR) image processing, comprising:
   a region determining unit for receiving luminance and chrominance signals having different exposure times and among the different exposure times, analyzing the correlation between a luminance signal having a first exposure time and a luminance signal having a second exposure time that is longer than the first exposure time, and dividing each of the luminance signal having the first exposure time and the luminance signal having the second exposure signal into at least one of a bright region, a transition region, and a dark region, based on the result of the analysis; and a normalizing unit for normalizing the regions of the luminance signal having the first exposure time so as to respectively correspond to the regions of the luminance signal having the second exposure time.

14. The apparatus of claim 13, wherein the analysis of the correlation is conducted using a 2D histogram expressing luminance components in the same pixel of the luminance signal having the first exposure time and the luminance signal having the second exposure time.

15. A wide dynamic range (WDR) image processing apparatus, comprising:

a luminance/chrominance converting unit for converting image signals obtained at different exposure times into luminance and chrominance signals;

a pre-processing unit for normalizing a luminance signal having a first exposure time among the different exposure times to correspond to a luminance signal having a second exposure time that is longer than the first exposure time;

a luminance fusing unit for adding up the luminance signal having the second exposure time and the normalized luminance signal having the first exposure time using a first weight;

a chrominance fusing unit for adding up a chrominance signal having the first exposure time and a chrominance signal having the second exposure time using a second weight to which the result of the addition of the luminance fusing unit is reflected; and an RGB converting unit for converting the fused luminance signal output from the luminance fusing unit and the fused chrominance signal output from the chrominance fusing unit into an RGB signal to be output as a WDR resultant image signal.

16. The WDR image processing apparatus of claim 15, wherein the pre-processing unit comprises:

a region determining unit for analyzing the correlation between the luminance signal having the first exposure time and the luminance signal having the second exposure time, and dividing each of the luminance signal having the first exposure time and the luminance signal having the second exposure time into at least one of a bright region, a transition region, and a dark region, based on the result of the analysis; and a normalizing unit for normalizing the regions of the luminance signal having the first exposure time so as to respectively correspond to the regions of the luminance signal having the second exposure time.

17. The WDR image processing unit of claim 15, wherein the luminance fusing unit comprises:

a weight calculation unit for calculating a first weight using the luminance signal having the second exposure time and the result of division of the regions; and a weight adding unit for adding up the luminance signal having the second exposure time and the normalized luminance signal having the first exposure time using the calculated first weight.

18. The WDR image processing apparatus of claim 17, wherein the luminance fusing unit further comprises a post-processing unit for performing a contrast ratio enhancing process on the result of the addition of the weight adding unit.

19. The WDR image processing apparatus of claim 15, wherein the chrominance fusing unit comprises:

a weight calculation unit for calculating the second weight using the luminance signal having the first exposure time, the luminance signal having the second exposure time, and the result of addition of the luminance fusing unit; and a weight adding unit adding the chrominance signal having the first exposure time and the chrominance signal having the second exposure time using the calculated second weight.

* * * * *